United States Patent
Feng et al.

(10) Patent No.: US 9,001,076 B2
(45) Date of Patent: Apr. 7, 2015

(54) TOUCH PANEL

(71) Applicant: Beijing FUNATE Innovation Technology Co., Ltd., Beijing (CN)

(72) Inventors: Chen Feng, Beijing (CN); Li Qian, Beijing (CN); Yu-Quan Wang, Beijing (CN)

(73) Assignee: Beijing FUNATE Innovation Technology Co., Ltd., Bejing (CN)

( * ) Notice: Subject to any disclaimer, the term of this patent is extended or adjusted under 35 U.S.C. 154(b) by 57 days.

(21) Appl. No.: 13/863,797

(22) Filed: Apr. 16, 2013

(65) Prior Publication Data

US 2014/0144766 A1 May 29, 2014

(30) Foreign Application Priority Data

Nov. 23, 2012 (CN) .......................... 2012 1 0481056

(51) Int. Cl.
G06F 3/045 (2006.01)
H01H 1/027 (2006.01)
B82Y 15/00 (2011.01)

(52) U.S. Cl.
CPC ................ *H01H 1/027* (2013.01); *B82Y 15/00* (2013.01)

(58) Field of Classification Search
USPC ............ 345/156, 173, 174; 178/18.01–18.07, 178/19.01–19.05
See application file for complete search history.

(56) References Cited

U.S. PATENT DOCUMENTS

| | | | |
|---|---|---|---|
| 2007/0063630 A1* | 3/2007 | Guo et al. | 313/311 |
| 2009/0153502 A1* | 6/2009 | Jiang et al. | 345/173 |
| 2009/0167710 A1* | 7/2009 | Jiang et al. | 345/173 |
| 2010/0093247 A1* | 4/2010 | Jiang et al. | 445/24 |
| 2011/0011528 A1* | 1/2011 | Wu et al. | 156/247 |
| 2011/0032196 A1* | 2/2011 | Feng et al. | 345/173 |
| 2011/0159190 A1* | 6/2011 | Liu et al. | 427/294 |
| 2014/0145817 A1* | 5/2014 | Feng et al. | 338/47 |
| 2014/0145980 A1* | 5/2014 | Feng et al. | 345/173 |

* cited by examiner

*Primary Examiner* — Ricardo L Osorio
(74) *Attorney, Agent, or Firm* — Novak Druce Connolly Bove + Quigg LLP

(57) ABSTRACT

A capacitance-type touch panel includes an insulating layer, a first transparent conductive layer, a number of first electrodes, a second transparent conductive layer, and at least one second electrode. The first transparent conductive layer includes a carbon nanotube film. The carbon nanotube film includes a number of carbon nanotube wires substantially parallel with each other and a number of carbon nanotube clusters located between the number of carbon nanotube wires. The carbon nanotube wires extend along an X direction and are spaced from each other along a Y direction. The carbon nanotube clusters between each adjacent two of the carbon nanotube wires are spaced from each other along the X direction. The X direction is intercrossed with the Y direction.

20 Claims, 5 Drawing Sheets

TOUCH PANEL

CROSS-REFERENCE TO RELATED APPLICATIONS

This application claims all benefits accruing under 35 U.S.C. §119 from China Patent Applications: Application No. 201210481056.4, filed on Nov. 23, 2012 in the China Intellectual Property Office, disclosures of which are incorporated herein by references.

BACKGROUND

1. Technical Field

The present disclosure relates to capacitance-type touch panels, particularly to a carbon nanotube based capacitance-type touch panel.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation.

Different types of touch panels, including a resistance-type, a capacitance-type, an infrared-type and a surface sound wave-type have been developed. A conventional capacitance-type touch panel includes a conductive indium tin oxide (ITO) layer as an optically transparent conductive layer. However, the ITO layer is generally formed by means of ion-beam sputtering and etched by laser beam, and the method is relatively complicated. Furthermore, the ITO layer has poor wearability, low chemical endurance and uneven resistance in an entire area of the panel. All the above-mentioned problems of the ITO layer produce a touch panel with low sensitivity, accuracy, and brightness.

What is needed, therefore, is to provide a capacitance-type touch panel which can overcome the short come described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present capacitance-type touch panels.

Figure 1:
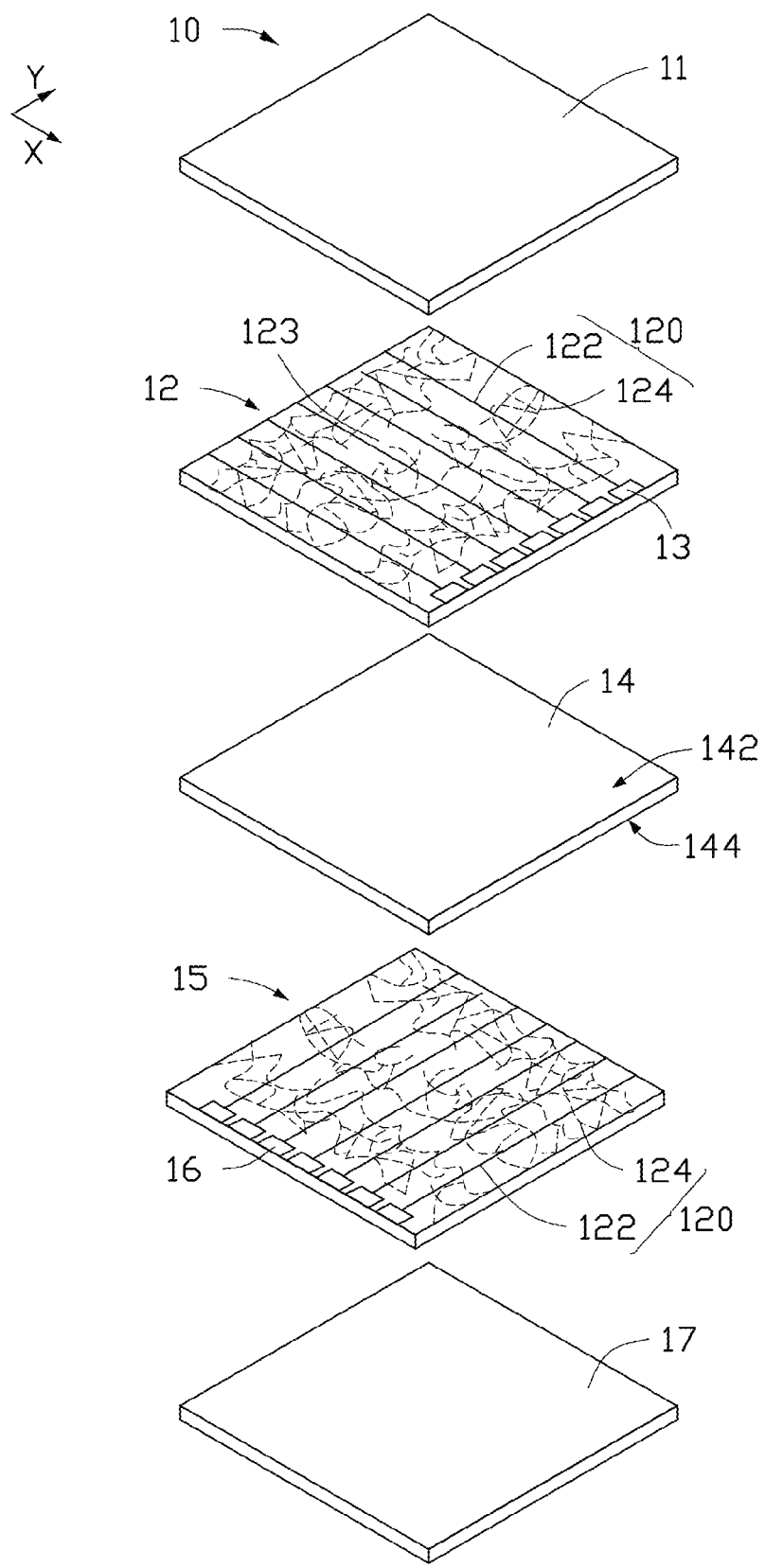
FIG. 1 is a schematic view of one embodiment of a capacitance-type touch panel.
Figure 2:
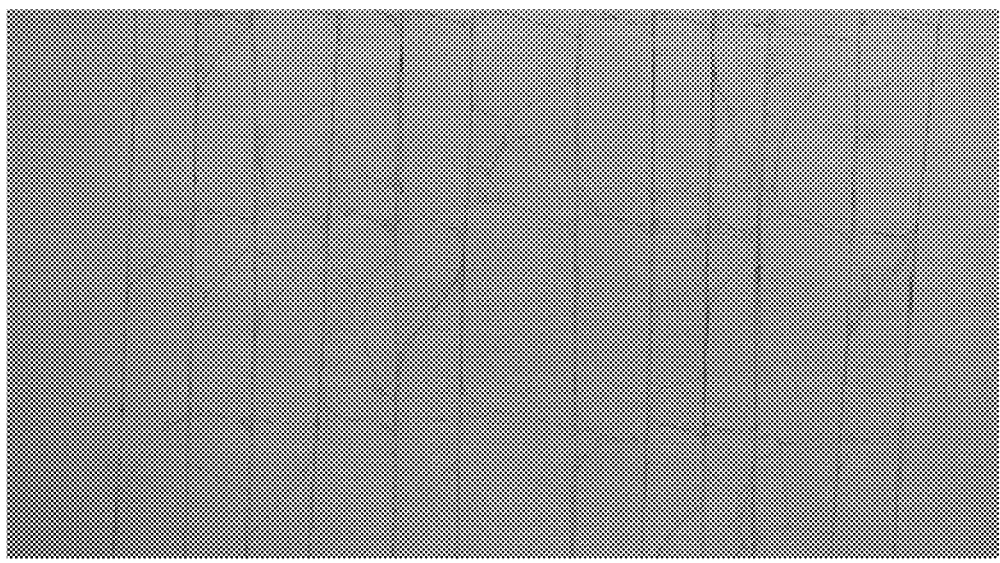
FIG. 2 is an optical microscope image of one embodiment of a carbon nanotube film.

Referring to FIG. 1, a capacitance-type touch panel 10 of one embodiment includes a first transparent conductive layer 12, a plurality of first electrodes 13, an insulating layer 14, a second transparent conductive layer 15, and a plurality of second electrodes 16.

The insulating layer 14 includes a first surface 142 and a second surface 144 opposite to the first surface 142. The first transparent conductive layer 12 is located on the first surface 142. The second transparent conductive layer 15 is located on the second surface 144. The plurality of first electrodes 13 are spaced from each other and electrically connected to the first transparent conductive layer 12. The plurality of second electrodes 16 are spaced from each other and electrically connected to the second transparent conductive layer 15.

The insulating layer 14 is configured to insulate the first transparent conductive layer 12 and the second transparent conductive layer 15. The insulating layer 14 can be a film or a sheet. The insulating layer 14 can be flat or curved. The insulating layer 14 can be transparent or opaque. The insulating layer 14 can be made of rigid materials such as glass, quartz, diamond, plastic or any other suitable material. The insulating layer 14 can also be made of flexible materials such as polycarbonate (PC), polymethyl methacrylate acrylic (PMMA), polyimide (PI), PET, polyethylene (PE), polyether polysulfones (PES), polyvinyl polychloride (PVC), benzocyclobutenes (BCB), acrylonitrile-butadiene-styrene copolymer (ABS), polyamide (PA), polyesters, or acrylic resin. The thickness of the insulating layer 14 can be in a range from about 0.1 millimeters to about 1 centimeter. In one embodiment, both the insulating layer 14 is a flat PET sheet with a thickness of about 0.4 millimeters.

The first transparent conductive layer 12 includes a carbon nanotube film 120 having resistance anisotropy. In one embodiment, the first transparent conductive layer 12 is a pure carbon nanotube film 120 consisting of a plurality of carbon nanotubes. The carbon nanotube film 120 is a free-standing structure. The term "free-standing structure" includes, but is not limited to, the fact that the carbon nanotube film 120 can sustain the weight of itself when it is hoisted by a portion thereof without any significant damage to its structural integrity.

The carbon nanotube film 120 includes a plurality of carbon nanotube wires 122 spaced from each other and a plurality of carbon nanotube clusters 124 joined to the plurality of carbon nanotube wires 122 by van der Waals attractive force. The plurality of carbon nanotube wires 122 are connected by the plurality of carbon nanotube clusters 124 so that the carbon nanotube film 120 is firm and has high strength. The plurality of carbon nanotube clusters 124 are separated by the plurality of carbon nanotube wires 122. The carbon nanotube clusters 124 between each adjacent two of the plurality of carbon nanotube wires 122 are spaced from each other.

The plurality of carbon nanotube wires 122 are parallel with each other, extend along an X direction, and spaced from each other along a Y direction. The X direction and the Y direction are not parallel. The X direction can be perpendicular with the Y direction. The plurality of carbon nanotube wires 122 form a plurality of conductive paths along the X direction. The plurality of carbon nanotube wires 122 are coplanar. The plurality of carbon nanotube wires 122 can be located equidistantly with each other. The distance between the adjacent two of the plurality of carbon nanotube wires 122 can be above 0.1 millimeters. The cross-section of each of the plurality of carbon nanotube wires 122 can be elliptical, rectangular, triangular or round. The effective diameter of each of the plurality of carbon nanotube wires 122 can be in a range from about 0.1 micrometers to about 100 micrometers. In one embodiment, the effective diameter of each of the plurality of carbon nanotube wires 122 can be in a range from about 5 micrometers to about 50 micrometers. The term "effective diameter" means the maximum length of the cross-section of each of the plurality of carbon nanotube wires 122. Each of the plurality of carbon nanotube wires 122 includes a plurality of carbon nanotubes arranged to extend along a length direction of the plurality of carbon nanotube wires 122 that is parallel to the X direction. The plurality of carbon nanotubes are joined end to end by van der Waals attractive force between. Thus, the carbon nanotube film 120 has the smallest resistance along an X direction parallel to the surface of the carbon nanotube film 120.

Figure 3:
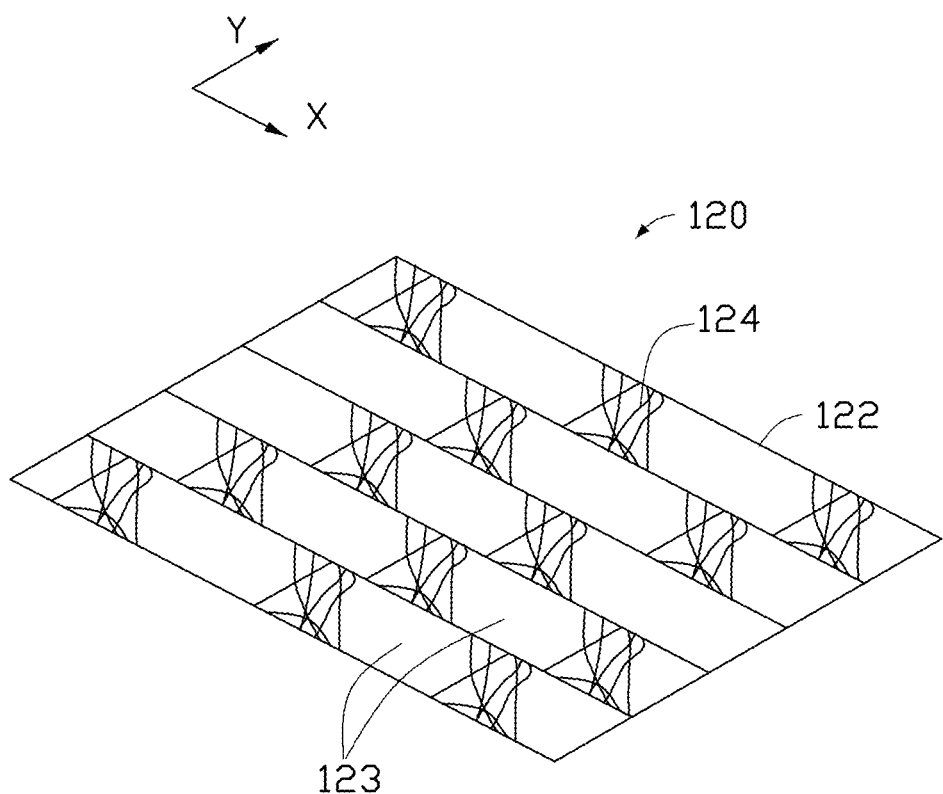
FIG. 3 is a schematic view of one embodiment of a carbon nanotube film of a capacitance-type touch panel.

The plurality of carbon nanotube clusters 124 can be spaced from each other, located between the plurality of carbon nanotube wires 122, and in contact with the plurality of carbon nanotube wires 122. Thus, the carbon nanotube film 120 forms a free-standing structure. Each of the plurality of carbon nanotube clusters 124 can be located between adjacent two of the plurality of carbon nanotube wires 122 and joined with the adjacent two of the plurality of carbon nanotube wires 122 by van der Waals attractive force. The plurality of carbon nanotube clusters 124 can be connected with each other to form a conductive path along the Y direction. The length of each of the plurality of carbon nanotube clusters 124 along the Y direction can be the same as the distance between the adjacent two of the plurality of carbon nanotube wires 122. The length of each of the plurality of carbon nanotube clusters 124 along the Y direction is greater than 0.1 millimeters. The carbon nanotube clusters 124 between the adjacent two of the plurality of carbon nanotube wires 122 are spaced from each other. Namely, the plurality of carbon nanotube clusters 124 are spaced from each other along the X direction. The distance between two of the plurality of carbon nanotube clusters 124 along the X direction is greater than 1 millimeter. In one embodiment, the plurality of carbon nanotube clusters 124 are arranged to form an array as shown in FIG. 1. Alternatively, adjacent two of the carbon nanotube clusters 124 arranged along the Y direction can be dislocated as shown in FIG. 3, namely, the carbon nanotube clusters 124 are not arranged to form a row along the Y direction.

The carbon nanotubes of each carbon nanotube cluster 124 are joined by van der Waals attractive force. An angle between the axial direction of each carbon nanotube of the carbon nanotube cluster 124 and the X direction is greater than 0 degrees and less than or equal to 90 degrees. In one embodiment, the angle between the axial direction of each carbon nanotube and the X direction is greater than or equal to 45 degrees and less than or equal to 90 degrees. In one embodiment, the angle between the axial direction of each carbon nanotube and the X direction is greater than or equal to 60 degrees and less than or equal to 90 degrees. Thus, the carbon nanotubes of each carbon nanotube cluster 124 can be intercrossed with each other to form a net structure.

The carbon nanotube film 120 can be a pure structure consisting of only the plurality of carbon nanotubes. The carbon nanotube film 120 defines a plurality of holes 123 between the plurality of carbon nanotube wires 122 and the plurality of carbon nanotube clusters 124. When the plurality of carbon nanotube wires 122 and the plurality of carbon nanotube clusters 124 are arranged regularly, the plurality of holes 123 are also arranged regularly. For example, when the plurality of carbon nanotube wires 122 and the plurality of carbon nanotube clusters 124 are arranged to form an array, the plurality of holes 123 are also arranged to form an array. A dutyfactor of the carbon nanotube film 120 is an area ratio between the total area of the plurality of carbon nanotube wires 122 and the plurality of carbon nanotube clusters 124 and the total area of the plurality of holes 123, namely, the ratio between the total area of the plurality of carbon nanotubes of the carbon nanotube film 120 and the total area of the plurality of holes 123. The dutyfactor of the carbon nanotube film 120 can be greater than 0 and less than or equal to 1:19. In one embodiment, the dutyfactor of the carbon nanotube film 120 is greater than 0 and less than or equal to 1:49 so that the light transmittance of the carbon nanotube film 120 is greater than 95%. In one embodiment, the light transmittance of the carbon nanotube film 120 is greater than 98%.

Furthermore, the carbon nanotube film 120 may include a minority of dispersed carbon nanotubes located around the plurality of carbon nanotube wires 122 and the plurality of carbon nanotube clusters 124. The minority of dispersed carbon nanotubes have little effect on the properties of the carbon nanotube film 120.

The plurality of carbon nanotube wires 122 can form a plurality of first conductive paths along the X direction. The plurality of carbon nanotube clusters 124 can form a plurality of second conductive paths along the Y direction as shown in FIG. 1. The plurality of first conductive paths are spaced from each other along the Y direction and the plurality of second conductive paths are spaced from each other along the X direction. Thus, the carbon nanotube film 120 is electrical conductive both along the X direction and the Y direction. The carbon nanotube film 120 is resistance anisotropy having the resistance along the Y direction greater than the resistance along the X direction. The resistance ratio between the resistance along the Y and the resistance along the X direction is greater than or equal to 10. In one embodiment, the resistance ratio between the resistance along the Y and the resistance along the X direction is greater than or equal to 20. In one embodiment, the resistance ratio between the resistance along the Y and the resistance along the X direction is greater than or equal to 50.

The carbon nanotube film 120 of FIG. 1 or FIG. 3 can be made by following steps:

step (a), providing a drawn carbon nanotube film, wherein the drawn carbon nanotube film is drawn from a carbon nanotube array and includes a plurality of successive and oriented carbon nanotubes joined end-to-end by van der Waals attractive force therebetween and arranged to extend along the same direction;

step (b), patterning the drawn carbon nanotube film so that at least one row openings are formed on the drawn carbon nanotube film along the extending direction of the oriented carbon nanotubes, wherein each of the at least one row openings includes a plurality of openings spaced from each other;

step (c), shrinking the patterned drawn carbon nanotube film by treating the patterned drawn carbon nanotube film with an organic solvent, wherein the organic solvent is volatile and can be ethanol, methanol, acetone, dichloromethane, or chloroform.

Figure 4:
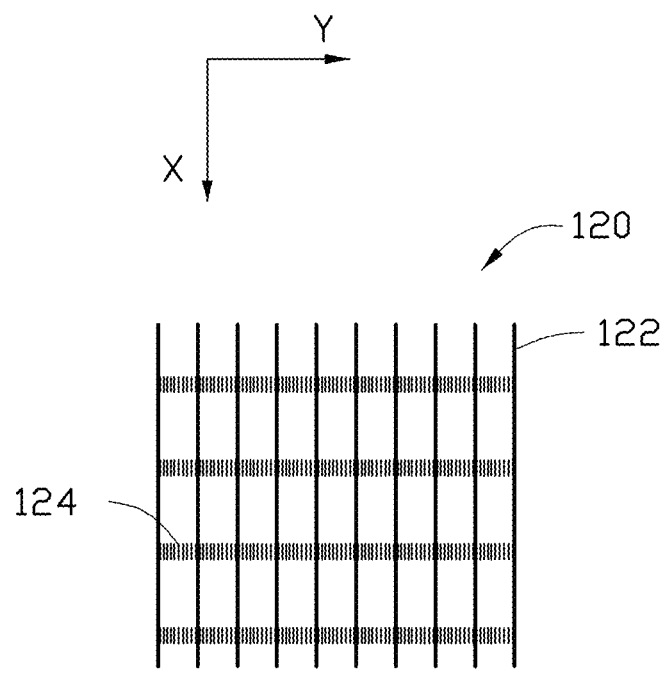
FIG. 4 is a schematic view of another embodiment of a carbon nanotube film of a capacitance-type touch panel.

Referring to FIG. 4, in one embodiment, the axial direction of each carbon nanotube of the carbon nanotube clusters 124 and the X direction can be greater than 0 degrees and less than or equal to 45 degrees. In one embodiment, the angle between the axial direction of each carbon nanotube of the carbon nanotube clusters 124 and the X direction can be greater than or equal to 0 degrees and less than or equal to 30 degrees. In one embodiment, the axial directions of the carbon nanotubes of the carbon nanotube clusters 124 are substantially parallel with the X direction, namely the carbon nanotubes of the carbon nanotube clusters 124 are substantially parallel with the carbon nanotube wires 122. The carbon nanotube film 120 of FIG. 4 can be made by the method similar to the method for making the carbon nanotube film 120 of FIG. 1 or FIG. 3 except that in step (c), the patterned drawn carbon nanotube film is treated with a water or an mixture of water and organic solvent. The water or the mixture of water and organic solvent has a smaller interfacial tension on the patterned drawn carbon nanotube film compare with pure organic solvent.

The first transparent conductive layer 12 can include a plurality of carbon nanotube films 120 stacked with each other or a plurality of coplanar carbon nanotube films 120 located side by side. The carbon nanotube wires 122 of adjacent two of the carbon nanotube films 120 can be overlapped and substantially parallel with each other. The carbon nanotube clusters 124 of adjacent two of the carbon nanotube films 120 can be overlapped or dislocated.

The carbon nanotube film 120 can be located on the insulating layer 14 directly and adhered to the insulating layer 14 by an adhesive layer (not shown). The adhesive layer is configured to fix the carbon nanotube film 120 on the insulating layer 14. The adhesive layer can be transparent, opaque, or translucent. The adhesive layer can be an UV glue layer or optically clear adhesive (OCA) layer. The OCA layer is a clear and transparent double-sided adhesive tape with a light transmittance greater than 99%. Material of the OCA layer is polymethyl methacrylate (PMMA), which also named as plexiglass or acrylic. The thickness of the adhesive layer can be in a range from about 1 nanometer to about 500 micrometers, for example, the thickness is in a range from about 1 micrometer to about 2 micrometers. In one embodiment, the adhesive layer is a PMMA layer with a thickness of 1.5 micrometers.

The plurality of first electrodes 13 are spaced from each other and arranged on a side of the first transparent conductive layer 12 along the Y direction. The plurality of first electrodes 13 can also be located on two opposite sides of the first transparent conductive layer 12. Number of the plurality of first electrodes 13 is greater than or equal to two. The plurality of first electrodes 13 are electrically connected with at least one of the plurality of carbon nanotube wires 122. The plurality of first electrodes 13 can be made of material such as metal, carbon nanotube, conductive polymer, conductive silver paste, or ITO. The plurality of first electrodes 13 can be made by etching a metal film, etching an ITO film, or printing a conductive silver paste. In one embodiment, the plurality of first electrodes 13 are made of conductive silver paste and made by printing conductive silver paste concurrently. Each of the plurality of first electrodes 13 is electrically connected with at least one of the plurality of carbon nanotube wires 122.

The second transparent conductive layer 15 is resistance anisotropy and includes a plurality of conductive paths along the Y direction. The second transparent conductive layer 15 can include the carbon nanotube film 120 or other patterned transparent conductive film such as patterned ITO layer or patterned ZnO layer. The patterned transparent conductive film can includes a plurality of conductive patterns in shape of rectangle or rhombus. In one embodiment, the first transparent conductive layer 12 is a carbon nanotube film 120 and the second transparent conductive layer 15 is a patterned ITO layer. In one embodiment, both the first transparent conductive layer 12 and the second transparent conductive layer 15 are carbon nanotube films 120 as shown in FIG. 1. The plurality of carbon nanotube wires 122 of the second transparent conductive layer 15 substantially extend along the Y direction.

The plurality of second electrodes 16 can be spaced from each other and arranged on a side of the second transparent conductive layer 15 along the X direction. The plurality of second electrodes 16 can also located on two opposite sides of the second transparent conductive layer 15. The plurality of second electrodes 16 are electrically connected with at least one of the plurality of carbon nanotube wires 122. The plurality of second electrodes 16 can be made of material such as metal, carbon nanotube, conductive polymer, conductive silver paste, or ITO. The plurality of second electrodes 16 can be made by etching a metal film, etching an ITO film, or printing a conductive silver paste. In one embodiment, the plurality of second electrodes 16 are made of conductive silver paste and made by printing conductive silver paste concurrently. Alternatively, a single second electrode 16 can be located on a side of the second transparent conductive layer 15 and electrically connected with all of the plurality of carbon nanotube wires 122. Alternatively, two second electrodes 16 can be located on two opposite sides of the second transparent conductive layer 15 with each electrically connected with all of the plurality of carbon nanotube wires 122. Alternatively, the plurality of second electrodes 16 can be omitted.

The capacitance-type touch panel 10 can further include a first substrate 11 and a second substrate 17. The first substrate 11, the first transparent conductive layer 12, the insulating layer 14, the second transparent conductive layer 15, and the second substrate 17 are stacked with each other in that order. The first substrate 11 and the second substrate 17 can be a thin plate or thin film. The first substrate 11 and the second substrate 17 can be flexible. The first substrate 11 and the second substrate 17 can be are used to support other elements. The materials of the first substrate 11 and the second substrate 17 can be the same as or different from the materials of the insulating layer 14. The thickness of the first substrate 11 and the second substrate 17 can be in a range from about 0.1 millimeters to about 1 centimeter. An adhesive layer can also be located between the first substrate 11 and first transparent conductive layer 12, or between the second substrate 17 and the second transparent conductive layer 15. In one embodiment, the first substrate 11 and the second substrate 17 are PET plate with a thickness of about 0.55 millimeters. Furthermore, other function layers can be inserted into the capacitance-type touch panel 10 according to need.

Because the first transparent conductive layer 12 and the second transparent conductive layer 15 are insulated by the insulating layer 14, a capacitance can be produced at the places where the first conductive paths of the first transparent conductive layer 12 intercrossed with the second conductive paths of the second transparent conductive layer 15. The capacitance can be detected by the sensing circuit (not shown) electrically connected to the first electrodes 13 and the second electrodes 16. When an object such as a finger or a stylus get close to or touch the capacitance-type touch panel 10 at the palaces where the first conductive paths of the first transparent conductive layer 12 intercrossed with the second conductive paths of the second transparent conductive layer 15, the capacitance will change, and the capacitance change can be detected by the sensing circuit to calculate and just the coordinate of the touch point.

Because the carbon nanotube film 120 is resistance anisotropy with different resistances along the X direction and the Y direction, the distances between the touch point and the electrodes 13 and 16 are different, the resistance between the touch point and the electrodes 13 and 16 are much different. The coordinate of the touch point can be calculated and just according to the capacitance difference detected at the electrodes 13 and 16. Because the plurality of carbon nanotube wires 122 are electrically connected by the plurality of carbon nanotube clusters 124, the capacitance detected at the electrodes 13 and 16 includes the capacitance signal of the corresponding carbon nanotube wire 122 and the electric signal of the corresponding carbon nanotube cluster 124. Thus, the capacitance change at the touch point is larges and significant before and after being touched by the object even if the touch pressure is small. The large and significant capacitance changes can improve the detection accuracy of the capacitance-type touch panel 10.

The carbon nanotubes have good mechanical properties, good chemical stability, and good moisture resistance, the carbon nanotube film 120 of the capacitance-type touch panel 10 also has the above advantages. Thus, the capacitance-type touch panel 10 has good usability and long service life.

Figure 5:
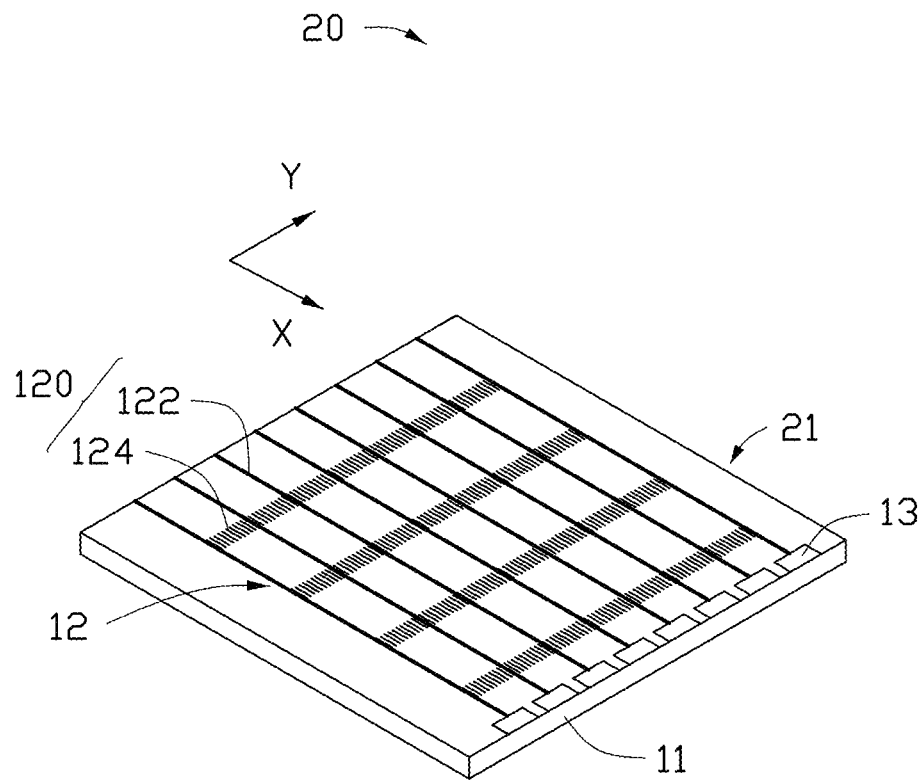
FIG. 5 is a schematic view of another embodiment of a capacitance-type touch panel.
Figure 5:
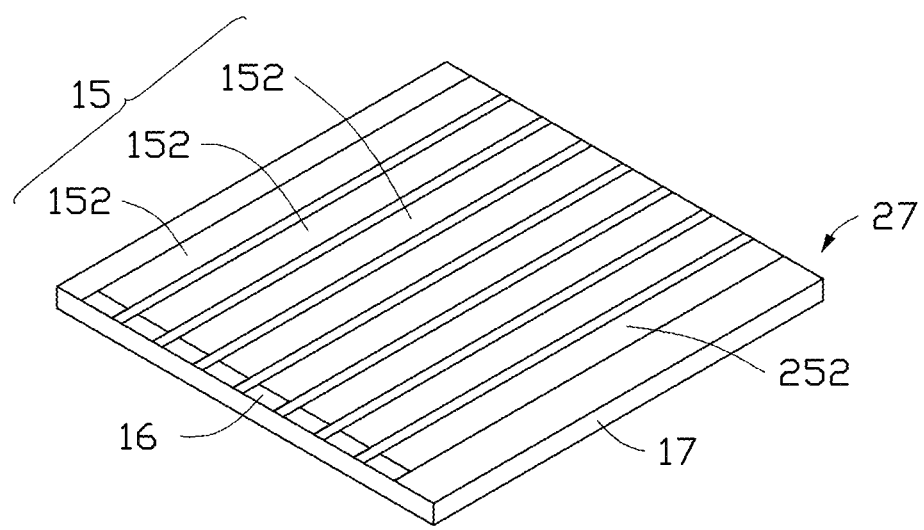

Referring to FIG. 5, a capacitance-type touch panel 20 of one embodiment includes a first electrode plate 21 and a second electrode plate 27. The first electrode plate 21 and the second electrode plate 27 are stacked with and insulated from each other.

The first electrode plate 21 includes a first substrate 11, a first transparent conductive layer 12, and a plurality of first electrodes 13. The first transparent conductive layer 12 is located on the first substrate 11. The plurality of first electrodes 13 are spaced from each other and electrically connected to the first transparent conductive layer 12. The first transparent conductive layer 12 includes a carbon nanotube film 120 having resistance anisotropy. The first substrate 11 can be located between the first transparent conductive layer 12 and the second electrode plate 27 and used as an insulating layer. In one embodiment, the first substrate 11 is a PET film, and the first transparent conductive layer 12 is a single carbon nanotube film 120 of FIG. 4. The carbon nanotube film 120 is fixed on the first substrate 11 by a UV glue layer, and the plurality of carbon nanotube wires 122 of the carbon nanotube film 120 extend along the X direction. The plurality of first electrodes 13 are made of conductive silver paste and made by printing conductive silver paste concurrently. The plurality of first electrodes 13 are arranged along the Y direction and spaced from each other. The plurality of first electrodes 13 are located on the same side of the carbon nanotube film 120. Each of the plurality of first electrodes 13 is electrically connected with one of the plurality of carbon nanotube wires 122.

The second electrode plate 27 includes a second substrate 17, a second transparent conductive layer 15, and a plurality of second electrodes 16. The second transparent conductive layer 15 is located on the second substrate 17. The plurality of second electrodes 16 are spaced from each other and electrically connected to the second transparent conductive layer 15. The second transparent conductive layer 15 has resistance anisotropy. The second substrate 17 can also be located between the second transparent conductive layer 15 and the first electrode plate 21 and used as an insulating layer. In one embodiment, the second substrate 17 is a glass plate, and the second transparent conductive layer 15 is a patterned ITO layer. The patterned ITO layer includes a plurality of rectangle ITO structures 152. The plurality of rectangle ITO structures 152 extend along the Y direction and are spaced from each other along the X direction. The plurality of second electrodes 16 are made of conductive silver paste and made by printing conductive silver paste concurrently. The plurality of second electrodes 16 are arranged along the X direction and spaced from each other. The plurality of second electrodes 16 are located on the same side of the patterned ITO layer. Each of the plurality of second electrodes 16 is electrically connected with one of the plurality of rectangle ITO structures 152. The rectangle ITO structures 152 are fixed on the PET film of the first substrate 11 by an OCA layer.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A capacitance-type touch panel comprising:
    an insulating layer having a first surface and a second surface opposite to the first surface;
    a first transparent conductive layer located on the first surface; wherein the first transparent conductive layer comprises a carbon nanotube film; the carbon nanotube film comprises a plurality of carbon nanotube wires substantially parallel with each other and a plurality of carbon nanotube clusters located between the plurality of carbon nanotube wires; the plurality of carbon nanotube wires extend along an X direction and are spaced from each other along a Y direction, some of the plurality of carbon nanotube clusters, between each adjacent two of the plurality of carbon nanotube wires, are spaced from each other along the X direction; and the X direction intersects with the Y direction;
    a plurality of first electrodes spaced from each other and electrically connected to the first transparent conductive layer;
    a second transparent conductive layer located on the second surface, wherein the second transparent conductive layer is resistance anisotropy and comprises a plurality of conductive paths along the Y direction; and
    at least one second electrodes electrically connected to the second transparent conductive layer.

2. The capacitance-type touch panel of claim 1, wherein the carbon nanotube film consists of a plurality of carbon nanotubes.

3. The capacitance-type touch panel of claim 1, wherein the plurality of carbon nanotube wires are connected by the plurality of carbon nanotube clusters, and the carbon nanotube film is a free-standing structure.

4. The capacitance-type touch panel of claim 1, wherein the plurality of carbon nanotube clusters are joined to the plurality of carbon nanotube wires by van der Waals attractive force.

5. The capacitance-type touch panel of claim 1, wherein each of the plurality of carbon nanotube wires comprises a plurality of carbon nanotubes arranged to extend along the X direction and joined end to end by van der Waals attractive force between.

6. The capacitance-type touch panel of claim 1, wherein a distance between adjacent two of the plurality of carbon nanotube wires is above 0.1 millimeters.

7. The capacitance-type touch panel of claim 6, wherein a length of each of the plurality of carbon nanotube clusters along the Y direction is the same as the distance between the adjacent two of the plurality of carbon nanotube wires.

8. The capacitance-type touch panel of claim 7, wherein the length of each of the plurality of carbon nanotube clusters along the Y direction is greater than 0.1 millimeters.

9. The capacitance-type touch panel of claim 1, wherein a distance between adjacent two of the plurality of carbon nanotube clusters along the X direction is greater than 1 millimeter.

10. The capacitance-type touch panel of claim 1, wherein a resistance ratio between a first resistance along the Y of the carbon nanotube film and a second resistance along the X direction of the carbon nanotube film is greater than or equal to 20.

11. The capacitance-type touch panel of claim 1, wherein the carbon nanotube film is adhered to the insulating layer by an adhesive layer.

12. The capacitance-type touch panel of claim 1, wherein the plurality of first electrodes are arranged on the same side of the first transparent conductive layer along the Y direction and electrically connected with at least one of the plurality of carbon nanotube wires.

13. The capacitance-type touch panel of claim 1, wherein the plurality of first electrodes are located on two opposite sides of the first transparent conductive layer and electrically connected with at least one of the plurality of carbon nanotube wires.

14. The capacitance-type touch panel of claim 1, wherein a plurality of second electrodes are arranged on the same side of the second transparent conductive layer and spaced from each other along the X direction.

15. The capacitance-type touch panel of claim 1, wherein each of the first transparent conductive layer and the second transparent conductive layer comprises the carbon nanotube film.

16. A capacitance-type touch panel comprising:
an insulating layer having a first surface and a second surface opposite to the first surface;
a first transparent conductive layer located on the first surface; wherein the first transparent conductive layer comprises a carbon nanotube film; the carbon nanotube film comprises a plurality of carbon nanotube wires substantially parallel with each other and a plurality of carbon nanotube clusters located between the plurality of carbon nanotube wires; the carbon nanotube film defines a plurality of holes, and a dutyfactor of the carbon nanotube film is less than or equal to 1:19;
a plurality of first electrodes spaced from each other and electrically connected to the first transparent conductive layer;
a second transparent conductive layer located on the second surface; and
at least one second electrodes electrically connected to the second transparent conductive layer.

17. The capacitance-type touch panel of claim 16, wherein the dutyfactor of the carbon nanotube film is less than or equal to 1:49.

18. A capacitance-type touch panel comprising:
a first electrode plate, wherein the first electrode plate comprises:
a first substrate;
a first transparent conductive layer located on the first substrate; wherein the first transparent conductive layer comprises a carbon nanotube film; the carbon nanotube film comprises a plurality of carbon nanotube wires substantially parallel with each other and a plurality of carbon nanotube clusters located between the plurality of carbon nanotube wires; the plurality of carbon nanotube wires extend along an X direction and are spaced from each other along a Y direction; some the plurality of carbon nanotube clusters between each adjacent two of the plurality of carbon nanotube wires are spaced from each other along the X direction; and the X direction intersects with the Y direction; and
a plurality of first electrodes spaced from each other and electrically connected to the first transparent conductive layer; and
a second electrode plate stacked with and insulated from the first electrode plate, wherein the second electrode plate comprises:
a second substrate;
a second transparent conductive layer located on the second substrate, wherein the second transparent conductive layer is resistance anisotropy and comprises a plurality of conductive paths along the Y direction; and
at least one second electrode electrically connected to the second transparent conductive layer.

19. The capacitance-type touch panel of claim 18, wherein the first substrate is located between the first transparent conductive layer and the second electrode plate.

20. The capacitance-type touch panel of claim 18, wherein the second substrate is located between the second transparent conductive layer and the first electrode plate.

* * * * *